United States Patent [19]
Moody

[11] 3,984,744
[45] Oct. 5, 1976

[54] D.C. VOLTAGE CONTROL SYSTEM

[76] Inventor: Warren E. Moody, 95 Siesta Way, Fort Lauderdale, Fla. 33301

[22] Filed: Sept. 26, 1974

[21] Appl. No.: 509,675

[52] U.S. Cl. .................... 318/442; 200/12; 318/139
[51] Int. Cl.² .......................................... H02P 7/20
[58] Field of Search ............... 318/248, 442, 139; 200/12, 13

[56] References Cited
UNITED STATES PATENTS

| | | | |
|---|---|---|---|
| 1,291,233 | 1/1919 | Storer | 318/248 X |
| 1,474,942 | 11/1923 | Probst | 318/139 |
| 1,781,892 | 11/1930 | Chipmen | 200/12 |
| 2,333,772 | 11/1943 | Eaton | 318/342 X |
| 3,241,019 | 3/1966 | Gross | 318/139 |
| 3,249,836 | 5/1966 | Stamm | 318/139 X |
| 3,300,698 | 1/1967 | Bopp et al. | 318/248 X |
| 3,336,516 | 8/1967 | Keeley | 318/248 X |
| 3,437,282 | 4/1969 | Honkonen et al. | 318/342 X |
| 3,611,091 | 10/1971 | Gunderson | 318/248 |

*Primary Examiner*—B. Dobeck
*Attorney, Agent, or Firm*—Edwin E. Greigg

[57] ABSTRACT

A speed control system for electric vehicles for varying the applied voltage to a series wound traction motor to vary the speed thereof by dividing the main power source into a number of small units, which are then grouped and re-grouped through a series of relays actuated by a controller to provide several values of voltage from low to high voltage in an orderly progressive manner. The circuit is also provided with a ballast or surge-limiting resistor in each grouping and re-grouping, resulting in a smooth power flow and thus smooth speed change while at the same time limiting the battery drain to a safe maximum. The ballast resistor is automatically shunted out of the power circuit as the vehicle picks up speed, thereby providing an intermediate control point between each battery re-grouping step.

11 Claims, 1 Drawing Figure

U.S. Patent   Oct. 5, 1976   3,984,744
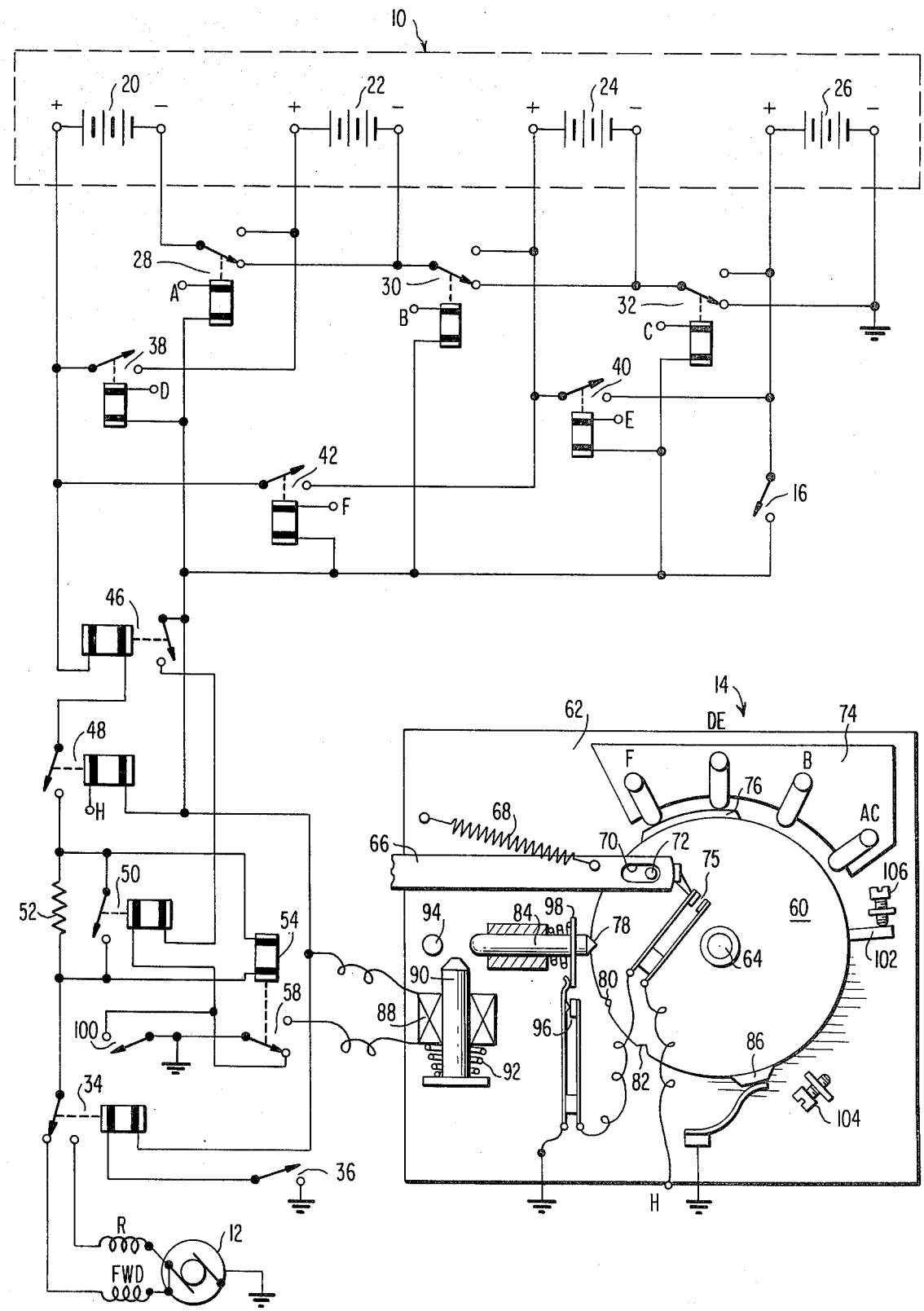

D.C. VOLTAGE CONTROL SYSTEM

BACKGROUND OF THE INVENTION

In general, present day electric vehicles, such as golf carts, fork lift trucks and automobiles, control their speed by means of a rheostat or a series of fixed resistors which are cut in and out of the power circuit by various relays or step switches controlled by the operator. This method provides satisfactory speed control but there is a great waste of battery power in heating the resistors, resulting in a shortened operating range in time and distance for the vehicles.

SUMMARY OF THE INVENTION

This invention eliminates the power waste in the present day vehicles in that it provides a simple and economical means for varying the applied voltage to a series wound traction motor by dividing the main source (actually a plurality of similar batteries) which are then grouped and re-grouped to provide several values of voltage without the use of dropping resistors with their inherent power losses. A controller is provided which will actuate the battery re-grouping relays in an orderly progressive manner from low to high voltage and a ballast or surge-limiting resistor is placed in the power circuit, at each voltage (speed change) position, resulting in a smooth power flow while limiting the battery drain to a safe maximum. This ballast resistor is automatically shunted out of the power circuit as the vehicle picks up speed, thereby providing an intermediate control point between each battery re-grouping step.

BRIEF DESCRIPTION OF THE DRAWING

The single FIGURE is a semi-schematic circuit diagram showing the power source, the motor and details of the relay actuating controller.

DESCRIPTION OF THE PREFERRED EMBODIMENT

In the drawing, the main power source, indicated in its entirety as 10, is shown connected to drive the direct current series-type vehicle drive motor 12, whose rotational speed, and therefore vehicle speed is controlled by a manually operable controller, indicated in its entirety as 14, when the conventional key-type ignition switch 16 is turned on.

The main power source 10 comprises a plurality of equal voltage batteries 20, 22, 24 and 26, of the proper size and voltage for the series wound traction motor 12. Relays 28, 30 and 32, as shown in the drawing adjacent the batteries, and relay 34 shown adjacent the motor 12, are single-pole double-throw relays for heavy currents. Relays 28, 30 and 32 have their lower contacts normally closed as shown. Direction control relay 34 is controlled by switch 36 for providing forward and reverse control of the motor 12. Relays 38, 40 and 42 are single-pole, single-throw, normally open relays, also of the type to handle heavy currents, and relay 46 is a single-pole, single-throw series time delay relay with a heavy coil winding to carry the full motor current. Main relay 48 is a heavy duty single-pole, normally open relay with heavy duty contacts capable of making and breaking the heavy currents involved and relay 50 is a single-pole, single-throw, normally open relay in shunt with ballast resistor 52. The coil of a sensitive adjustable single-pole double-throw relay 54 is in parallel with the ballast-resistor 52 and is energized by the voltage drop across the resistor 52.

Controller 14 comprises a rotatable controller disc 60 mounted for rotation on a base 62 about center pin or pivot 64 by an accelerator control rod 66 biased by spring 68 in the "off" position, that is, to the left as shown in the drawing. Control rod 66 is connected to the disc 60 through a lost motion connection comprising elongated slot 70 in the rod and pin 72 on the disc 60. The lost motion connection is sufficient to open and close switch contacts 75 (which are insultated from control rod 66) without further moving of the contact disc 60. The base 62 is provided with an insulation block 74 having four electrical contacts F, DE, B, and AC, which are connected to the coils A, B, C, D, E, and F of the corresponding relays 28, 30, 32, 38, 40, and 42. The disc 60 is also provided with a raised contactor segment 76 capable of bridging and electrically grounding two of the four contacts F, DE, B and AC in each of three positions and shown as notches 78, 80 and 82. The notches are engageable by a spring-loaded detent plunger 84. The three positions (notches) correspond to the proper setting of the disc in relation to the four contacts F, DE, B, and AC and the disc itself is grounded by a spring-biased braking and ground shoe 86 which engages the side edge of the disc.

The controller 14 is also provided with a solenoid 88 with a plunger 90 biased by springs 92 toward a disengaged position to lock detent plunger 84 in one of the three positions when actuated to prevent further shifting of the control rod 66 until the current in the ballast resistor 52 drops to a safe value. It is to be noted that a reinforcing post 94 is provided to help sustain the plunger 90 against pressure that may result if an attempt was made to force disc 60 into a higher speed position.

Finally, controller 14 is also provided with a normally closed switch 96 in series with switch 75 and opened by a collar 98 on the spring-actuated detent plunger 84 for the purposes which will be understood in connection with the description of the operation of the invention. The circuit is further provided with an emergency power switch 100 (located in the drawing adjacent the relay 34 and motor 12) to close relay 50 and thereby shunt the resistor 52 in case of low battery voltage or high power requirements, such as may be necessitated by the climbing of a steep hill by the vehicle.

OPERATION OF THE SPEED CONTROL SYSTEM

In operation, the ignition or starting switch 16 is closed (turned on), thus energizing the control circuit and closing relays 30, 40 and 42, the coils of which are connected to their respective contacts F, D, and E on controller 14 which are, in turn, grounded through the contactor segment 76 on the rotatable controller disc 60 and ground shoe 86. At this point all battery elements have their negative terminals grounded through the normally closed lower contacts of relays 28, 30 and 32 and all the positive terminals connected through relays 38, 40 and 42 and through series relay 46 to the contactor of main relay 48 which is now open. All battery elements are now is parallel for their lowest voltage.

A slight forward motion of the accelerator control rod 66 will close switch contacts 75 which are in series with a closed detent switch contact 96 to operate the main relay 48 which has its coil terminal H connected to the controller contact H. Closing of the main contactor of relay 48 provides power to the motor 12 through the winding of series time delay relay 46, ballast resistor 52, and direction control relay 34. The initial heavy surge of current is limited by ballast resistor 52 which develops sufficient voltage drop across it to energize sensitive relay 54, thereby energizing solenoid coil 88 in the controller 14 to pull in plunger 90, thereby locking detent plunger 84 in its first position 78 to prevent further movement of the rotating controller disc 60 at this time. Series time delay relay 46 momentarily remains open to isolate the coil of relay 50 from the power source to allow time for the relay 54 to operate and break the grounding contact from the relay 50.

As the vehicle accelerates, the current drops through ballast resistor 52 and eventually opens sensitive relay 54 which releases solenoid plunger 90, while at the same time, actuating relay 50 which now short-circuits the ballast resistor 52. Relay 50 now is connected to the power source 10 through closed series relay 46 and the lower grounding contact of relay 54. Ballast resistor 52, now shorted out, provides a power boost to motor 12 by the elimination of its voltage drop.

With solenoid-actuated locking plunger 90 withdrawn, spring-loaded detent plunger 84 can be withdrawn from its first position notch 78 by further motion of the control rod 66 which begins to rotate the controller disc 60 toward the set of contacts DE and B. However, before contact segment 76 leaves contact F, the withdrawl of detent plunger 84 will break switch contact 96 and open the main relay 48 which will remain open until the detent plunger 84 falls in second notch 80. Opening of the main relay 48 will open series relay 46, thus opening relay 50 and in so doing, places resistor 52 back in the power circuit. Further movement of the control rod 66 will cause rotation of the controller disc 60 until contactor segment 76 covers contacts DE and B. As contactor segment 76 leaves contact F, relay 42 will open while relays 38 and 40 will remain closed and relay 30 will close the normally open upper contact.

An examination of the new circuit at this point will show that the batteries 20 and 22 have their negative terminals connected together through relay 28 and batteries 24 and 26 have their negative terminals connected together and grounded through relay 32. Furthermore, batteries 20 and 22 have their positive terminals connected together through relay 38 and batteries 24 and 26 have their positive terminals connected together through relay 40, while parallel batteries 20 and 22 are in series with parallel batteries 24 and 26 through upper contact of relay 30. Thus, the batteries are now arranged in a series parallel connection giving double the original single-battery voltage.

Further movement of the control rod 66 will raise the detent plunger 84 and open switch 96, again opening the main relay 48 and continued movement of the control rod 66 will cause contacting segment 76 to leave contacts DE which will open relays 38 and 40 while contact B remains grounded, leaving relay 30 with its upper contacts closed. Further motion of the control rod 66 and contacting segment 76 will cause the latter to reach contact AC which will cause relays 28 and 32 to open their normally closed lower contacts and close their upper contacts. Examination of this circuit will now show that relays 38, 40 and 42 are open and all battery elements are in series through the upper contacts of relays 28, 30 and 32, thus providing four times the original voltage.

Further movement of the control rod 66 will rotate the controller disc 60 until pin 102 on the controller disc 60 engages its adjustable stop means in the form of a screw 104 and detent plunger 84 falls into the third position (notch 82) closing the contact 96, thus operating main relay 48 and initiating the third cycle of the automatic control system as described above in connection with relays 46, 54, 50 and ballast resistor 52.

Normal driving of the vehicle will take place in the third position until it becomes necessary to slow down or stop.

The return spring bias 68 of the control rod 66 will cause the contol rod 66, when released, to move away from the pin 72 on the controller disc 60 by an amount of lost motion permitted by the slot 70, thus breaking the switch contact 75 and thus opening the contacts of main relay 48, which will remain open until the controller disc 60 returns to its first position and the pin 102 hits stop 106. Friction brake and grounding shoe 86 will hold the controller disc 66 firmly enough to insure the breaking of the contacts 75 upon the return rotation.

As controller disc 66 returns to its first position, contacting segment 76 will leave contacts AC and B and will return to ground the contacts DE and F so as to actuate all relays to their original position with all battery elements in parallel ready to re-start the vehicle.

However, it should be noted that the main relay 48 can be opened and closed by a short back-and-forth movement of the control rod against contacts 75 without upsetting the detent 84 or changing the battery connection. Furthermore, the controller can be dropped backward from the third position to the second position and a slight forward movement of the control rod 66 will again operate the main contactor of relay 48 with batteries re-grouped in the series parallel circuit if required for slower speed or hill climbing.

Due to the extra width of segment 76, relays 28, 30, 32, 38, 40 and 42 will switch when relay 48 is opened by detent contact 96 so that they do not make or break any current flow, which function is handled solely by heavy duty main relay 48.

An emergency manually operable power switch 100 is provided so that it will, when closed, eliminate resistor 52 from the power circuit so as to apply a full battery voltage to motor 19 when necessary.

What is claimed is:

1. A control system providing various voltages to a D. C. motor from a plurality of direct current sources of substantially equal voltages, said control system comprising:

first relay means coupled to each of the plurality of direct current sources for selectively coupling all said sources in parallel, in series-parallel, and in series to provide D. C. power at output terminals from all sources substantially equally;

a manually actuatable controller including electrical switching elements coupled to said first relay means for selectively energizing said first relay means according to the actuation of said controller;

a resistance means in series with the D. C. motor; and a safety interlock means on the controller, operationally responsive to a current through the resistance means, said safety interlock means preventing manual actuation of the controller to provide a higher voltage to the D. C. motor until said current has dropped to a safe value.

2. The system claimed in claim 1 wherein said controller includes a control means for controlling the selection of said electrical switching elements and for actuating electrical contacts which control a further relay means having contactors in series between said first relay means and said motor.

3. The system claimed in claim 1 wherein said controller includes a rotatable contactor disc having on its periphery an electrical contactor for contacting said electrical switching elements, said disc further having a plurality of notches, said controller including a spring-biased detent plunger positioned to engage said notches to resist further rotation of said disc, said notches being positioned so that upon engagement of said detent plunger in a notch said contactor will electrically connect with two adjacent ones of said switching elements.

4. The system claimed in claim 3 wherein said safety interlock means includes an electrical solenoid positioned to prevent disengagement of said spring-biased detent plunger when said solenoid is energized.

5. The system claimed in claim 4 which further includes a relay having its coil in parallel with said resistance means and responsive to the IR drop across said resistance means, said relay being connected to energize said solenoid.

6. The system claimed in claim 5 including a further relay having normally open electrical contacts in series between said current sources and said motor, and circuit switching means coupled to said spring-biased detent plunger for de-energizing the coil of said further relay and thereby disconnecting said motor from said current source during rotational movement of said rotatable contact disc.

7. The system claimed in claim 6 wherein said controller includes a manually operable control rod having at one end an elongated slot coupled through a lost motion connection to a pin in the surface of said contactor disc, said control rod being coupled to acutate a circuit switch on said disc for energizing the coil of said further relay without rotation of said contactor disc.

8. The system claimed in claim 6 including time-delay relay means responsive to said current for preventing actuation of said third relay means for a predetermined time after initiation of said current.

9. The control system claimed in claim 1, further including second relay means connected to monitor the I-R drop across said resistance means, and coupled to release said safety interlock means on said controller when said current drops to a safe value.

10. The system claimed in claim 9, further including third relay means, which, when actuated, short-circuits said resistance means, said second relay means being connected to actuate said third relay means upon release of said interlock means.

11. The system claimed in claim 10 further including manually operable switching means for actuating said third relay means.

* * * * *